US009498065B2

(12) United States Patent
Kunstadt

(10) Patent No.: US 9,498,065 B2
(45) Date of Patent: Nov. 22, 2016

(54) MODULAR STRUCTURE AND METHOD FOR PREPARING SAME

(71) Applicant: Robert Kunstadt, New York, NY (US)

(72) Inventor: Robert Kunstadt, New York, NY (US)

( * ) Notice: Subject to any disclaimer, the term of this patent is extended or adjusted under 35 U.S.C. 154(b) by 612 days.

(21) Appl. No.: 14/012,069

(22) Filed: Aug. 28, 2013

(65) Prior Publication Data

US 2015/0064375 A1    Mar. 5, 2015

(51) Int. Cl.

| | | |
|---|---|---|
| *B29C 61/02* | (2006.01) | |
| *A47C 7/00* | (2006.01) | |
| *A63B 23/16* | (2006.01) | |
| *B29C 65/66* | (2006.01) | |
| *A63B 21/00* | (2006.01) | |
| *B29C 33/38* | (2006.01) | |
| *E04B 1/35* | (2006.01) | |
| *B32B 37/14* | (2006.01) | |
| *E04B 1/32* | (2006.01) | |
| *E04H 9/16* | (2006.01) | |
| *E04H 15/20* | (2006.01) | |
| *E04B 2/22* | (2006.01) | |
| *E04B 2/50* | (2006.01) | |

(52) U.S. Cl.
CPC ........... *A47C 7/00* (2013.01); *A63B 21/00189* (2013.01); *A63B 23/16* (2013.01); *B29C 33/3821* (2013.01); *B29C 61/02* (2013.01); *B29C 65/66* (2013.01); *E04B 1/35* (2013.01); *B29K 2995/0049* (2013.01); *B32B 37/144* (2013.01); *E04B 1/32* (2013.01); *E04B 2/22* (2013.01); *E04B 2/50* (2013.01); *E04B 2001/327* (2013.01); *E04H 9/16* (2013.01); *E04H 15/20* (2013.01); *Y10T 29/49616* (2015.01); *Y10T 29/49863* (2015.01); *Y10T 29/49865* (2015.01); *Y10T 29/49867* (2015.01); *Y10T 428/13* (2015.01); *Y10T 428/1328* (2015.01); *Y10T 428/1334* (2015.01); *Y10T 428/1345* (2015.01); *Y10T 428/1352* (2015.01); *Y10T 428/1372* (2015.01); *Y10T 428/1397* (2015.01)

(58) Field of Classification Search
CPC .............. A63B 21/00189; A63B 23/16; A63H 31/00; B29C 33/3821; B29C 61/02; B29C 65/66; Y10T 428/1328; Y10T 428/1334; Y10T 428/1345; Y10T 428/1352; Y10T 428/1372; Y10T 428/1397; Y10T 29/49863; Y10T 29/49865; Y10T 29/49867; B32B 37/144; B29K 2995/0049
USPC ............................................... 156/84, 85, 86
See application file for complete search history.

(56) References Cited

U.S. PATENT DOCUMENTS

| | | | |
|---|---|---|---|
| 5,558,460 A | | 9/1996 | Jenkins |
| 5,891,000 A | * | 4/1999 | Phillips ............ A63B 21/00189 473/594 |
| 6,398,992 B1 | * | 6/2002 | Jacobson ............ B29C 33/3821 264/108 |

OTHER PUBLICATIONS

CIRCO Bean Bag Chair, www.Target.com.
(Continued)

*Primary Examiner* — Walter B Aughenbaugh

(57) ABSTRACT

The invention is a structure comprising a tensioned skin filled with shaped modules for bearing compression. In an uncompressed state, the modules are pourable like sand, salt or sugar. When compressed by tensioning of the skin, the modules lock up so that the skin filled tightly with modules comprises a load-bearing structure.

8 Claims, 5 Drawing Sheets

(56) References Cited

OTHER PUBLICATIONS

"Bag Pile"—by Formless Finder, Feb. 25, 2011, www.archdaily.com and www.mascontext.com.
Heimplanent Webpage, "Tents", Aug. 1, 2013.
North Sails Webpage, "How Is 3DL Made?", Aug. 27, 2013.

* cited by examiner

MODULAR STRUCTURE AND METHOD FOR PREPARING SAME

FIELD OF THE INVENTION

This invention relates to the field of building materials for provision of structural support.

SUMMARY OF THE INVENTION

The invention is generally a structure comprising a tensioned skin filled with shaped modules for bearing compression. In an uncompressed state, the modules are pourable like sand, salt or sugar. When compressed by tensioning of the skin, the modules lock up so that the skin filled tightly with modules comprises a load-bearing structure, such as a supporting-arch for a house; or alternatively, for a piece of furniture (such as a chair base or leg). The structure may optionally be dis-assembled for easy transport, by releasing the skin tension and removing the modules.

Consider, on the one hand, powder snow blown by the wind into soft drifts; and on the other hand, an avalanche field set up by the compressive force of a massive high-speed downhill flow, in which the very same snow comes to have the consistency of a cement which can trap a human victim of the avalanche. The invention aims at a similar initial easy flow for filling of the skin with polyhedrons, with subsequent lockup into a relatively rigid load-bearing structure upon tensioning of the skin.

The basic "building block" commonly used in the prior art for construction of structures, is similar to the wooden blocks used by children: it is a 6-sided element in the shape of a rectangular prism (i.e., a "brick").

Now according to the invention, construction may readily be accomplished by use of a regular "building block" of a higher order than a "brick", for example a 12-sided element in the shape of a dodecahedron. Such an element may have 12 equal sides, each side being in the shape of a pentagon (having 5 edges). Each edge of a pentagon is equal. Hence, pentagons may be prepared by manufacture of numerous "sticks" for forming their edges, all being essentially identical; either by a hand-manufacture process that can be accomplished with unskilled labor using primitive tools; or alternatively by an industrial process of repetitive manufacture in an automated factory setting.

E.g., to construct an embodiment of a structure according to the invention, one might bring to the site only a 3D printer for preparing modular elements in the form of dodecahedrons of the nature described herein; powdered material in bulk as feedstock for the printer; and appropriately pre-shaped skin material which may be folded flat for shipping. Hence, structures according to the invention may be appropriate for construction and use in remote regions of the world; as airlifted emergency shelter in disaster areas, military housing in combat zones, or the like. Such structures may be made permanent, or capable of dis-assembly, removal and re-use as desired. Such structures may be more substantial than a fabric tent, but less bulky and hence more convenient to transport and erect than conventional brick, stone, steel, concrete or wood-framed housing.

The skin may be tensioned, if it is generally in the form of a closed cylindrical column made from a sheet material, such as sheet of paper or fabric, by bending it. If paper is chosen for the skin, it may be a waterproof paper having a polymeric coating.

Alternative tensioning means include using heat-shrinkable PVC (or polyolefin or the like) tube for the skin; or, twisting the skin; or, making a braided skin and pulling the ends like a chinese finger-puzzle; or, lacing the skin tight with string, rope or cable or the like (as in the "pigskin" of a laced football); or, applying vacuum suction as in the vacuum-bagging process. Heat-shrinkable PVC sheet, such as that used to construct form-fitting winter covers for boats, may be employed as the skin. Alternatively, heat-shrinkable adhesive tape of the kind used for insulation of electrical wiring, may be employed as the skin. Such tape adheres to itself so that an expanse of skin may be formed from slightly-overlapping bands of such tape. Preferably shrinkage of the heat-shrink material may be bi-axial in longitudinal and axial directions.

In accordance with the invention, the proportions between the polyhedron size and shape and the skin size and shape, are selected to permit easy-flowing fill; as well as tight-lockup upon compression. Selection of component size proceeds in accordance with the desired size of the finished structure. Within any given cross-section of structure, the skin should contain enough polyhedrons with enough surfaces and edges that they interlock with themselves and the skin sufficient for supporting the intended load capacity of the finished structure.

The skin according to the invention may alternatively be made of a web, net or mesh. It may be a synthetic material capable of sustaining substantial tensile forces such as KEVLAR, DYNEEMA or SPECTRA. The skin may be provided with openings for passage of air; and/or transparent panels for transmission of light.

The skin need not be extraordinarily resistant to localized deformation. In fact, deformations in the skin caused by the vertices and edges of the polyhedrons contained within the skin, may create indented pockets within the skin that effectively serve to aid in capture of the polyhedrons contained within, thereby promoting their lockup into a relatively rigid structure. Similarly, the skin and the polyhedrons contained within need not be particularly smoothly-polished, since a certain degree of friction between said elements may promote lockup. So much friction that the polyhedrons cannot be effectively loaded and settled into place within the skin, should be avoided.

The skin may be pre-formed into a desired shape, for example a curved or contoured shape, by appropriate means. For example, if the skin is made of a sailcloth, it may be computer designed and formed upon a 3D mold. E.g., one such process is the NORTH SAILS 3DL THERMO-MOLDED SAIL TECHNOLOGY:

http://uk.northsails.com/TECHNOLOGY/3DLTechnology/Howis3DLMade/tabid/6907/lan guage/en-US/Default.aspx For use in cold climates, each polyhedron may be effectively sealed in its own polyethylene bag or the like, so that air flow within the overall skin is restricted for purposes of better insulation. The sealing material may be flexible (e.g., rubbery) and/or loosely-fitted to the polyhedrons, so that it is not liable to be punctured by vertices of adjoining polyhedrons.

Alternatively, each polyhedron may be filled or substantially filled with a lightweight and conformable foam material, such as polyurethane or polystyrene foam, for purposes of insulation. Such foam material may be soft and hence readily deformable, so that it does not tend to interfere with the lockup of the plurality of polyhedrons as a whole (because it gives way upon application of pressure from vertices of adjoining polyhedrons). Each polyhedron may thereby be formed as a dual-density construction from one material having a property of bearing compression without undue deformation, and another material that is relatively easily deformable.

Large structures may be pre-fabricated with a skin structure comprised of conjoined tubes, in a similar manner as a down vest may be constructed to form-fit to the human body by sewing it as a series of tubes, each tube being stuffed with down. In the case of the invention, polyhedrons may stuffed into the conjoined tubes such that they lock up, whereupon the entire structure of multiple tubes assumes its intended 3D-contoured configuration. Said skin may advantageously be of a rip-stop material to forestall propogation of tears.

Pentagons may be prepared by assembling them from 5 individual "sticks" that are connected together by lashings, adhesive, screw-connectors, rivets, ball-and-socket joints, snap-fitting, and/or other convenient means.

Pentagons may alternatively be prepared as integral flat sheets of suitable material, such as stamped metal or molded or die-cut plastic. In that case, there is no need to assemble individual pentagons onsite from 5 sticks each, since they may be transported to the site in flat stacks already in the desired pentagonal shape.

Or, pentagons may be prepared from sheet stock in an operation performed onsite.

Pentagons so prepared as above-indicated, may be perforated to reduce weight and to facilitate the interlocking described herein.

Dodecahedrons may be prepared by assembling them from 12 individual pentagons that are connected together by lashings, adhesive, screw-connectors, rivets, snap-fitting, and/or other convenient means.

If desired, "sticks" for edges, as well as pentagons and/or dodecahedrons prepared according to the invention, may be from recyclable material such as thermoplastics (e.g., ABS or the like). In that case, after use of a structure onsite, the structure may be recycled in whole or in part by melting its elements back into their constituent plastic mass, which may then readily be transported to another site and re-constituted when needed. Said "sticks" may be e.g. metal, wood, plastic, cardboard or other structural materials; in the form of bars, rods, beams, trusses, tubes or corrugations.

If de-construction and recycling is not required, the skin may be fiberglass or carbon-fiber cloth, coated with thermoset resin such as polyester or epoxy.

DETAILED DESCRIPTION OF THE INVENTION

Referring now to FIGS. 1-6, the invention will be described in detail.

Figure 1:
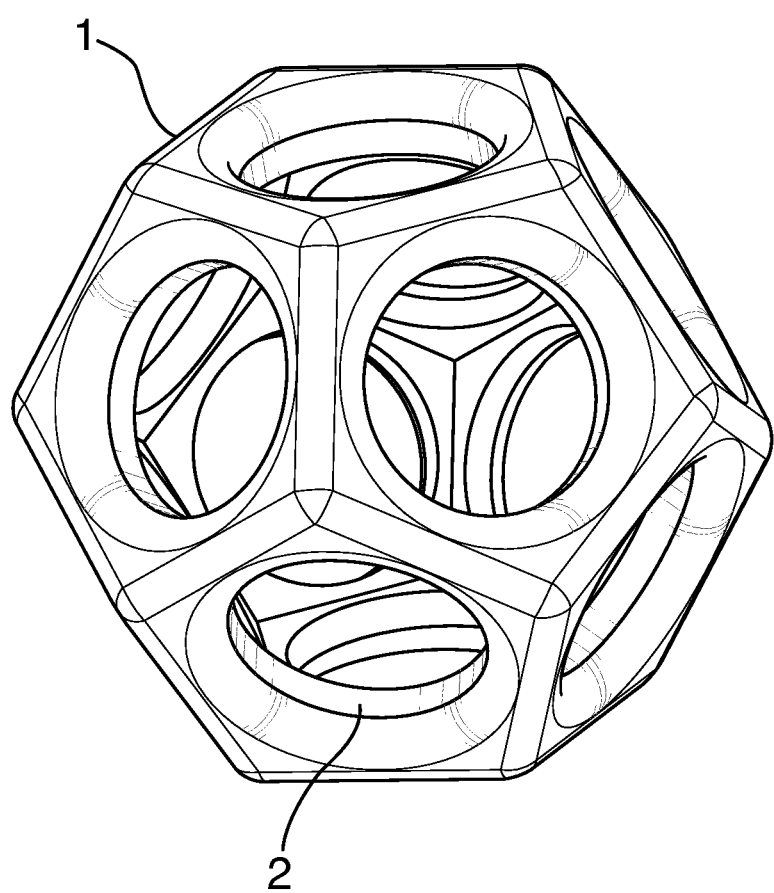
FIG. 1 is a front elevation of a polyhedron according to the invention.
Figure 2:
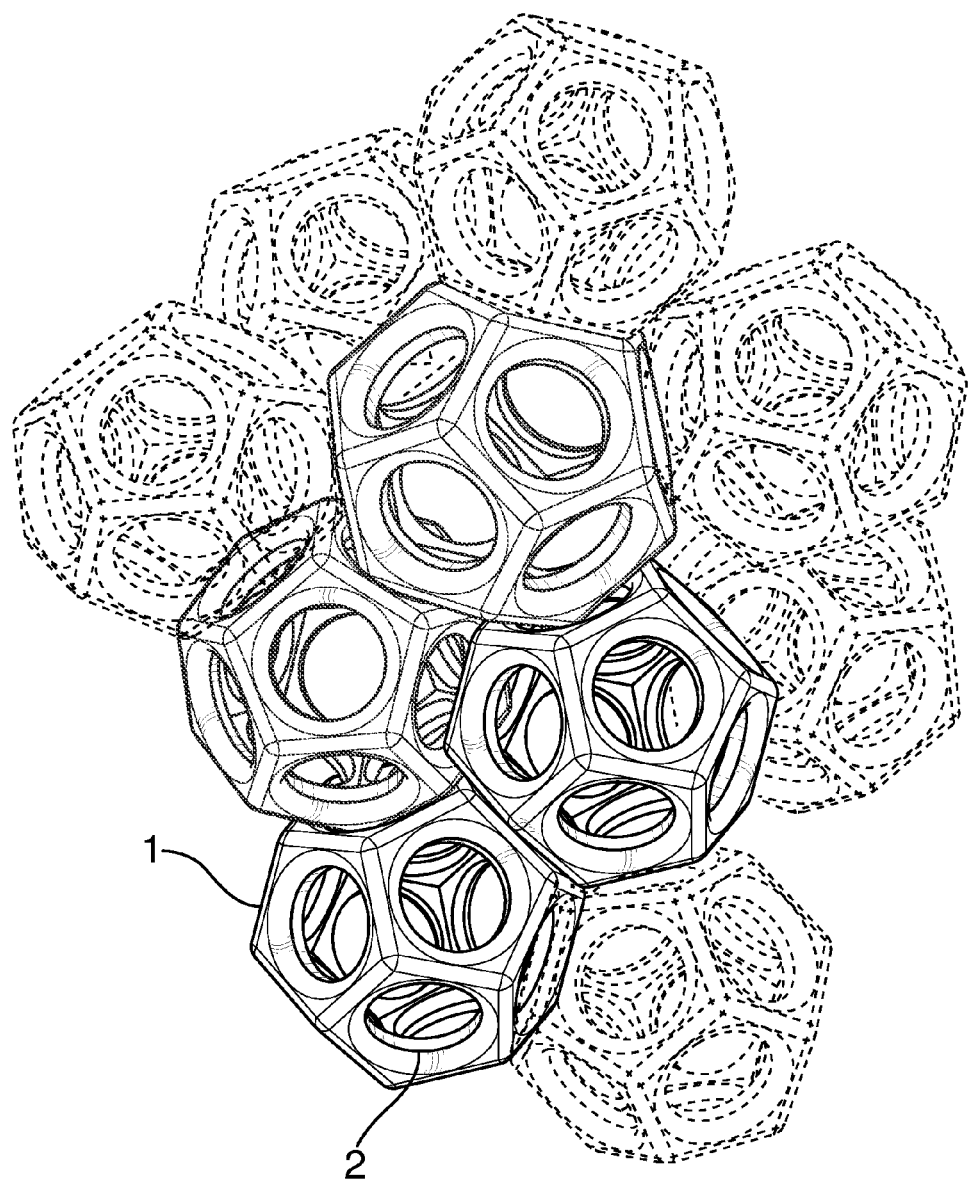
FIG. 2 is a perspective view of packed polyhedrons according to the invention.

Referring to FIGS. 1-2, polyhedrons 1 are in the shape of a dodecahedron (12 sides). They are hollow inside, to save weight. Each face is perforated with a hole 2, to save weight and to promote lockup (by being available to engage with a vertex of an adjoining polyhedron, as the polyhedrons are randomly packed and jostled to promote settling together tightly). Polyhedrons 1 as shown and described, serve the purpose of permitting flow while promoting lockup on compression.

Polyhedrons 1 may be a convenient material capable of bearing compression. They may be glass-filled nylon, 3D-printed by the SLS method or the like. They may be sized about ½ inch from one face, to the opposite parallel face. Alternatively, they may be of any convenient material capable of bearing compression, such as concrete. They may be sized larger, e.g., 1 foot from face to face. They may alternatively be molded or cast around forms, such as air-inflatable/deflatable plastic balls 1 foot in diameter. Forms may be made of expanded polystyrene beads or other inexpensive plastic materials. Such forms may be removed after molding or casting, or left in place since they weigh little and are inexpensive.

Polyhedrons 1 may alternatively be made of molded rigid-skinned polyurethane. Or, they may be constructed from a readily-available inexpensive material such as sand; held together by adhesive means or by laser sintering. In case sand is used, structures may readily be constructed in desert environments by means of the invention. Alternatively, structures may be constructed in harsh environments such as outer space, the moon, or planets such as Mars.

Since polyhedrons 1 are all substantially identical, they may be economically mass-produced by molding or casting. They may be, e.g., cast concrete for use in building large structures (such as houses).

Figure 3:
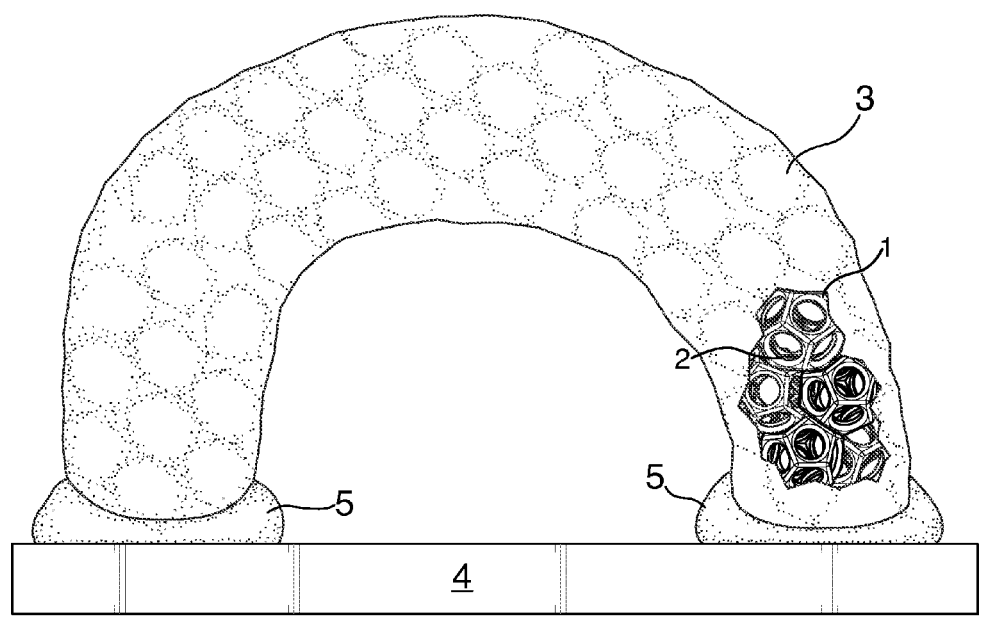
FIG. 3 is a front elevation of an embodiment of the invention, with cutaway showing polyhedrons packed within.
Figure 4:
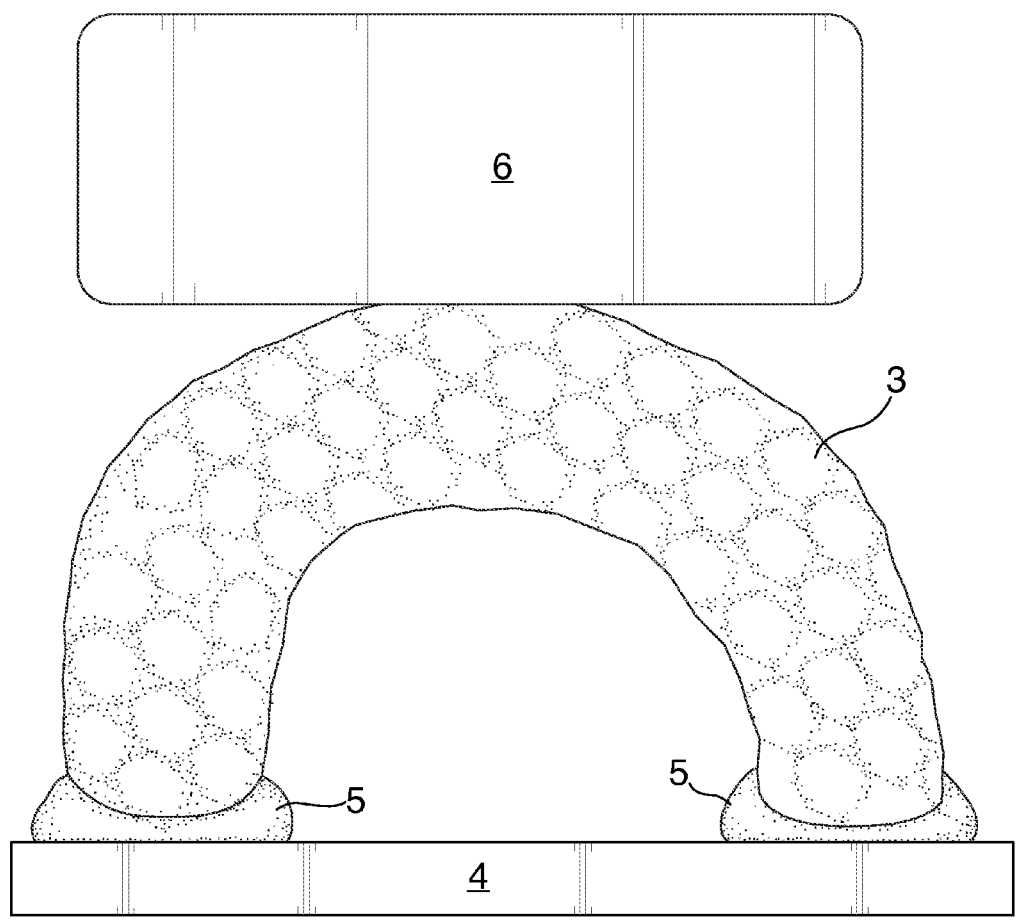
FIG. 4 is a front elevation of the embodiment of FIG. 3, bearing an illustrative load.

Filling a skin 3 with a plurality of said polyhedrons 1, sealing the skin ends, then bending the skin into an arch as shown in FIGS. 3 and 4, may in itself provide enough skin-tension to serve the purpose. Bending skin 3 tensions it, reduces the internal volume and compresses the contents.

Referring to FIGS. 3-4, skin 3 may be affixed to base 4 by means of epoxy putty 5. Skin 3, being so configured, thereupon supports illustrative load 6 (which may be, e.g., one end of a 2'-long piece of 2"×4" lumber).

In case polyhedrons 1 are sized at ½" as described above, skin 3 may be a cylinder having a diameter of about 1 inch, rolled from copy-machine paper.

The edges and vertices of polyhedrons 1 may be radiused, lessening any tendency to puncture skin 3.

Figure 5:
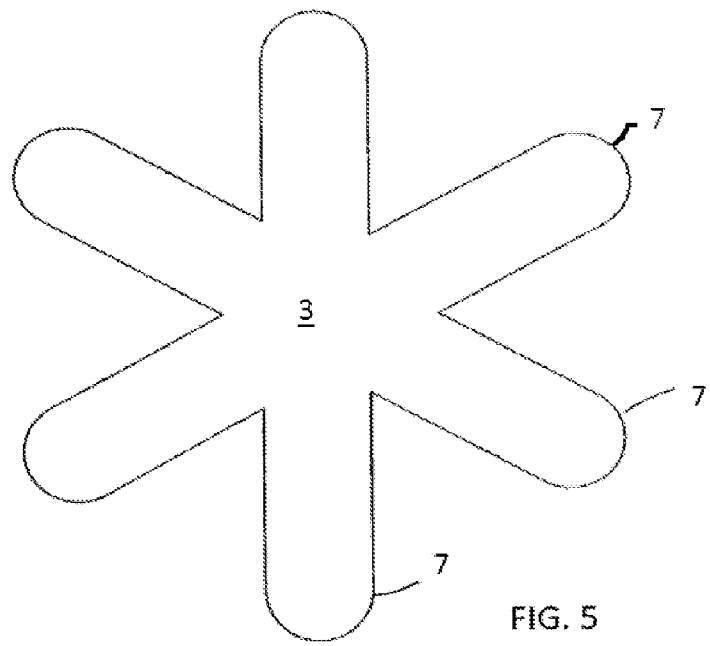
FIG. 5 is a top plan view of a skin according to an embodiment of the invention.

Referring to FIG. 5, in another embodiment skin 3 may be cut as a shaped pattern with tubular arms 7 radially arrayed. Skin 3 may be made of cloth, such as nylon or KEVLAR. Arms 7 of skin 3 may thereupon be filled with polyhedrons 1, and their ends closed.

Figure 6:
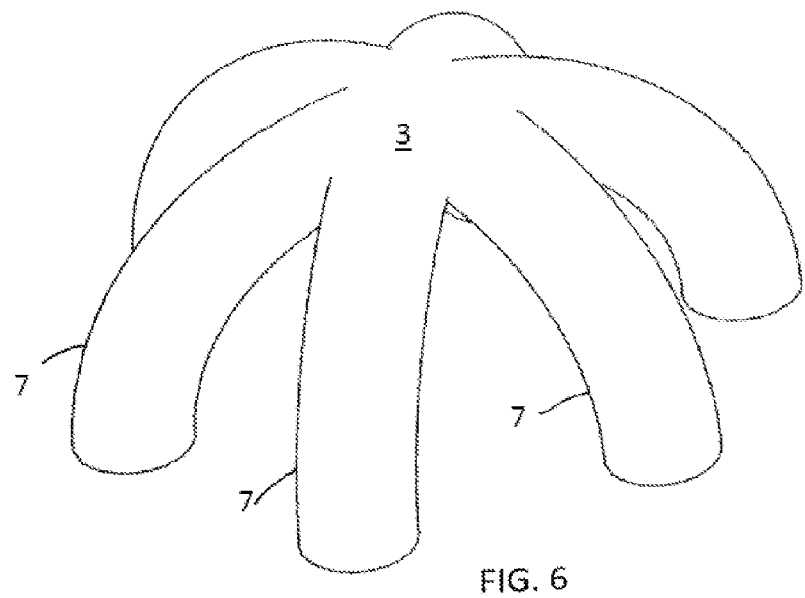
FIG. 6 is a perspective view of the skin of FIG. 5, after being packed with polyhedrons and bent into its load-bearing arched configuration.

Referring to FIG. 6, arms 7 may thereupon be bent downwardly in an arched manner, whereupon the packing of polyhedrons 1 within arms 7 in a locking manner may be accomplished. The resulted generally hemi-spherical structure is thereby rendered capable of supporting load; and may support a cover for weather-proofing. It may be provided with suitable ventilation, heating, cooling, drainage and/or plumbing; which may be run inside the hollow portions of arms 7 and polyhedrons 1 packed therein.

As used herein, the term "polyhedron" includes a multi-sided 3D-object that may have flat sides (perhaps its conventional meaning in geometry), but may have one or more or all of its sides contoured somewhat concavely, convexly, and/or otherwise non-uniformly; though consistent with achieving the structural capabilities of the invention. "Polyhedrons" is the plural of "polyhedron"; it is a synonym of "polyhedra". "Dodecahedrons" is the plural of "dodecahedron"; it is a synonym of "dodecahedra".

The invention is not limited to the exact embodiments and uses shown and described, and may be realized and implemented in such other ways as will be apparent to the skilled artisan, utilizing the teachings of the invention.

The invention claimed is:

1. A structure comprising a plurality of polyhedrons each having at least 7 sides, said polyhedrons being contained within a tensioned skin; said structure further comprising interstices between said polyhedrons; said interstices being free of carrier medium.

2. A structure according to claim 1, said polyhedrons having at least 12 sides.

3. A structure according to claim 2, said polyhedrons being hollow dodecahedrons having perforated faces.

4. A structure according to claim 3, said skin being a flexible fabric.

5. A method of building a structure, said method comprising the steps of filling a skin operatively free of carrier medium with a plurality of polyhedrons having at least 7 sides, and tensioning said skin.

6. A method according to claim 5; said polyhedrons being hollow, having at least 12 sides and having perforated faces.

7. A method according to claim 6, said tensioning comprising the step of application of heat to shrink said skin.

8. A method according to claim 6, said tensioning comprising the step of bending said skin.

* * * * *